US009251349B2

(12) United States Patent
Haikney et al.

(10) Patent No.: US 9,251,349 B2
(45) Date of Patent: Feb. 2, 2016

(54) VIRTUAL MACHINE MIGRATION

(71) Applicant: INTERNATIONAL BUSINESS MACHINES CORPORATION, Armonk, NY (US)

(72) Inventors: David Haikney, Manchester (GB); Shawn P. Mullen, Buda, TX (US); James W. Walker, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/781,581

(22) Filed: Feb. 28, 2013

(65) Prior Publication Data

US 2014/0173598 A1    Jun. 19, 2014

Related U.S. Application Data

(63) Continuation of application No. 13/327,488, filed on Dec. 15, 2011, now abandoned.

(51) Int. Cl.
| | |
|---|---|
| G06F 11/00 | (2006.01) |
| G06F 12/14 | (2006.01) |
| G06F 21/57 | (2013.01) |
| G06F 21/53 | (2013.01) |
| G06F 9/48 | (2006.01) |

(52) U.S. Cl.
CPC .............. *G06F 21/57* (2013.01); *G06F 9/4856* (2013.01); *G06F 21/53* (2013.01)

(58) Field of Classification Search
CPC ........ G06F 21/53; G06F 21/57; G06F 9/4856

USPC ........ 726/25, 1, 9, 23, 30; 713/150, 167, 176; 709/229, 232; 380/282
See application file for complete search history.

(56) References Cited

U.S. PATENT DOCUMENTS

| | | | |
|---|---|---|---|
| 2005/0114687 A1 | 5/2005 | Zimmer et al. | |
| 2006/0184653 A1 | 8/2006 | van Riel | |
| 2007/0094719 A1* | 4/2007 | Scarlata | 726/9 |
| 2007/0239979 A1* | 10/2007 | Berger et al. | 713/150 |
| 2008/0046581 A1 | 2/2008 | Molina et al. | |
| 2008/0282348 A1 | 11/2008 | Proudler et al. | |
| 2009/0089860 A1* | 4/2009 | Forrester et al. | 726/3 |
| 2009/0154709 A1 | 6/2009 | Ellison | |
| 2009/0241108 A1* | 9/2009 | Edwards et al. | 718/1 |

(Continued)

OTHER PUBLICATIONS

U.S. Appl. No. 13/327,488 entitled "Virtual Machine Migration"; Non-final office action dated Apr. 15, 2013 (10 pg).

(Continued)

*Primary Examiner* — Thuong Nguyen
(74) *Attorney, Agent, or Firm* — Eustace P. Isidore; Yudell Isidore PLLC

(57) ABSTRACT

Attesting a virtual machine that is migrating from a first environment to a second environment includes in response to initiation of migration of the virtual machine from the first environment to the second environment, accessing one or more stored trust values generated during the trusted boot of the virtual machine in the first environment, determining if the accessed trust values define a security setting sufficient for the second environment, and if the accessed trust values do not define a security setting sufficient for the second environment, performing a predetermined action in relation to the migration of the virtual machine to the second environment.

11 Claims, 4 Drawing Sheets

(56) References Cited

U.S. PATENT DOCUMENTS

| | | |
|---|---|---|
| 2009/0287837 A1 | 11/2009 | Felsher |
| 2009/0288167 A1 | 11/2009 | Freericks et al. |
| 2010/0011210 A1 | 1/2010 | Scarlata |
| 2010/0082991 A1 | 4/2010 | Baldwin et al. |
| 2010/0299763 A1 | 11/2010 | Marcus et al. |
| 2010/0306534 A1* | 12/2010 | Teijido et al. ............. 713/166 |
| 2012/0185913 A1* | 7/2012 | Martinez et al. ............. 726/1 |
| 2013/0097296 A1* | 4/2013 | Gehrmann et al. ............. 709/223 |
| 2013/0166869 A1* | 6/2013 | Wang et al. ............. 711/163 |

OTHER PUBLICATIONS

U.S. Appl. No. 13/327,488 entitled "Virtual Machine Migration"; Final office action dated Sep. 9, 2013 (15 pg).

* cited by examiner

VIRTUAL MACHINE MIGRATION

US PRIORITY CLAIM

The present application is a continuation of U.S. patent application Ser. No. 13/327,488, titled "Virtual Machine Migration," filed on Dec. 15, 2011, the contents of which is incorporated herein by reference in its entirety.

CLAIM FOR PRIORITY

The present application claims priority under 35 U.S.C. §119(a) to European Patent Application No. EP10195218.2, entitled "Virtual Machine Migration," filed on Dec. 15, 2010, the disclosure of which is hereby incorporated by reference in its entirety.

BACKGROUND

1. Technical Field

This invention relates to a method of, and system for, attesting a virtual machine migrating from a first environment to a second environment. More specifically, the invention provides the re-attestation of migrated virtual machines.

2. Description of the Related Art

A virtual machine provides a complete system platform which supports the execution of an operating system. An essential characteristic of a virtual machine is that the software run by the virtual machine is limited to the resources and abstractions provided by the virtual machine. In the case of virtual machine migration, the entire memory contents of the running system is moved over the network as it migrates from a source physical system to a target physical system. When the memory pages are moved over the network, they are more vulnerable to a particular type of cyber attack.

It is the case in virtual machine migration that the attestation on the original physical system may have been less stringent than what is required by the security level of the target system. For example security zones can be used within a private cloud which has a test zone and a release zone. These operational zones would have different security policies based on the sensitivity of the data being processed and the criticality of the systems operating within the perspective zones. The separate security policies governing these zones could include trusted boot requirements, security configuration, firewall and anti-virus software, for example.

The virtual machines in the test zone are instantiated and removed frequently, as is the nature of test systems. Once a test system is approved for release for general availability, it would be migrated out to the release zone. However the release zone would have stricter security requirements. The enterprise would want this migration to proceed with the same automation and ease of migration, and with the (re) attesting to a higher security level integrated into this process.

BRIEF SUMMARY

According to a first aspect of the present invention, there is provided a method of attesting a virtual machine migrating from a first environment to a second environment comprising in response to initiation of migration of the virtual machine from the first environment to the second environment, accessing one or more stored trust values generated during the trusted boot of the virtual machine in the first environment; determining if the accessed trust values define a security setting sufficient for the second environment, and if the accessed trust values do not define a security setting sufficient for the second environment, performing a predetermined action in relation to the migration of the virtual machine to the second environment.

BRIEF DESCRIPTION OF THE DRAWINGS

Embodiments of the present invention will now be described, by way of example only, with reference to the accompanying drawings, in which.

DETAILED DESCRIPTION

Figure 1:
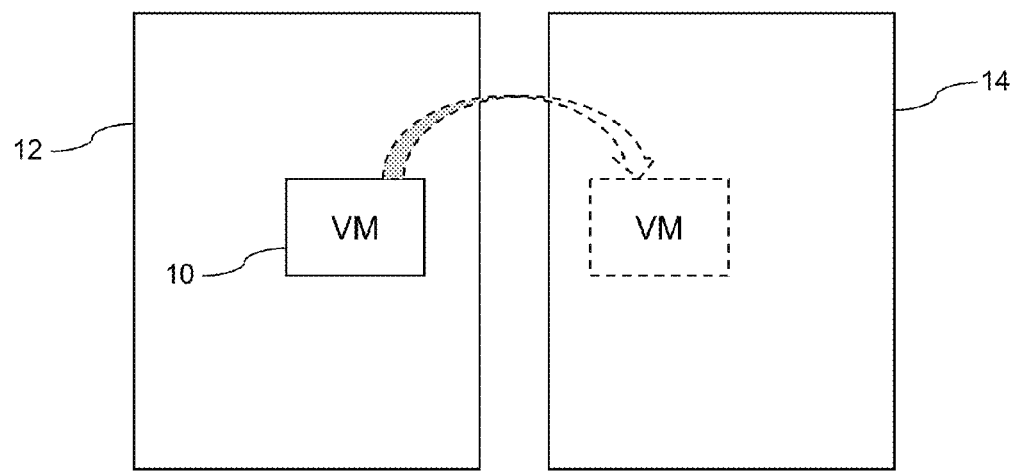
FIG. 1 is a schematic diagram of a virtual machine migrating between two zones.

Owing to the invention, it is possible to automate, within a migration process, the re-attesting to a higher or different security level during virtual machine migration. Currently as part of the TCG (Trusted Computing Group) standardized architecture, a system is remotely attested and allowed to connect to a network. Remote attestation is the action of an external trusted security management unit requesting security parameters or measurements from the computer system under inspection. Within the TCG architecture, this process of attestation and connection is called a TNC (Trusted Network Connect). Currently the TNC attestation process only occurs during the system's initial connection to the network. The invention provides the capability that a virtual machine that has been TNC attested for one vLAN or security zone, once it is being migrated to a different vLAN and security zone with different security requirements will be checked before the virtual machine migration can go ahead.

In one embodiment, the predetermined action in relation to the migration of the virtual machine to the second environment comprises preventing the migration of the virtual machine. If the stored trust values are not sufficient for the security settings of the new environment, then one way of dealing with this situation is to prevent the virtual machine from migrating to the new environment. This will ensure that if there is any way that the virtual machine is compromised with respect to the second environment, then the virtual machine will not be able to operate in that environment. The migration process will be halted and will not complete.

In a different embodiment, the predetermined action in relation to the migration of the virtual machine to the second environment comprises completing the migration of the virtual machine and placing limits on the operation of the virtual machine in the second environment. In this embodiment, if the stored trust values are not sufficient for the security settings of the new environment, then the migration can still be allowed to go ahead, but with reduced options for the virtual machine in the new environment. For example, the virtual machine may be limited in the nature of the operations that it can execute, or the communication channel that the virtual machine will use in the new environment will have limits placed on it. Specific monitoring of the virtual machine may also take place, to ensure that nothing is compromised as a result of the migration and operation of the virtual machine in the target environment.

Preferably, the method further comprises, following the initiation of the migration of the virtual machine to the second environment, transferring the stored trust values generated during the trusted boot of the virtual machine to a trusted management unit for the second environment. The stored trust values for the virtual machine that is being migrated can be bound to the virtual machine and will always be transferred whenever the virtual machine is migrated to a new environment. This is useful, as the component that originally authenticated the virtual machine through the trusted boot process may not be the same component that needs to authenticate the virtual machine when it is migrated to the new environment. A trusted management unit for the second environment can then access the stored trust values for the virtual machine and compare these to the security setting required for the second environment.

A virtual machine 10 is shown in FIG. 1. The virtual machine 10 is located in a first environment (or zone) 12 and is being migrated to a second environment (or zone) 14. Virtual machines allow the sharing of the underlying physical hardware resources between different virtual machines 10, each running its own operating system. As a result of the use of virtual machines, multiple operating system environments can co-exist on the same hardware, in isolation from each other, and the virtual machine 10 can provide an instruction set architecture that is somewhat different from that of the real hardware underlying the virtual machine 10. The use of a virtual machine 10 provides the user with direct access to the operating system and applications of the virtual machine 10.

The migration of the virtual machine 10 can occur for a number of reasons. The first environment 12 may be a specific server that is becoming overloaded because multiple virtual machines are being run on the server and they are using an increasingly large amount of resources. There will be a management unit present that manages the load on the server and it may be decided that maximum capacity is being approached and it is therefore desirable to migrate the virtual machine 10 to a different server. The management unit will organize the wholesale copying of the memory allocated to the virtual machine 10 to the new server represented by the second environment 14.

Alternatively, the two environments 12 and 14 may be located on the same physical machine, but have different settings. The first environment 12 may be a test zone and the second environment 14 may be a production zone, for example. Different security settings will apply to the different zones 12 and 14, even though they are located on the same physical hardware. However, a virtual machine 10 that is located in the test zone 12 may be migrated to the production zone 14, for example, under the instruction of an administrator of the server that is running the two zones 12 and 14. In the case of the virtual machine 10 being moved between zones on the same physical computer, it is unlikely that the entire memory contents would be copied, as there is no need since the physical memory may be used by a virtual machine 10 in both zones. It is more likely that the underlying virtualization system will change configuration to move to the new zone, e.g., network settings may be changed to execute the migration.

When a system is moved from one zone 12 to another zone 14, the migrated virtual machine 10 may reside in a different physical system, or may just be configured to run on a different VLAN (Virtual Local Area Network). The virtual machine 10 may move under the management of a separate virtual manager such as IBM Director or HMC (Hardware Management Console) or may remain under the control of the same virtual manager, but require a higher level of security requirements. The security of a virtual machine 10 is checked when it is first loaded, in a so-called "trusted boot". When the virtual machine 10 is booted certain trust values are captured during the boot process.

Figure 2:
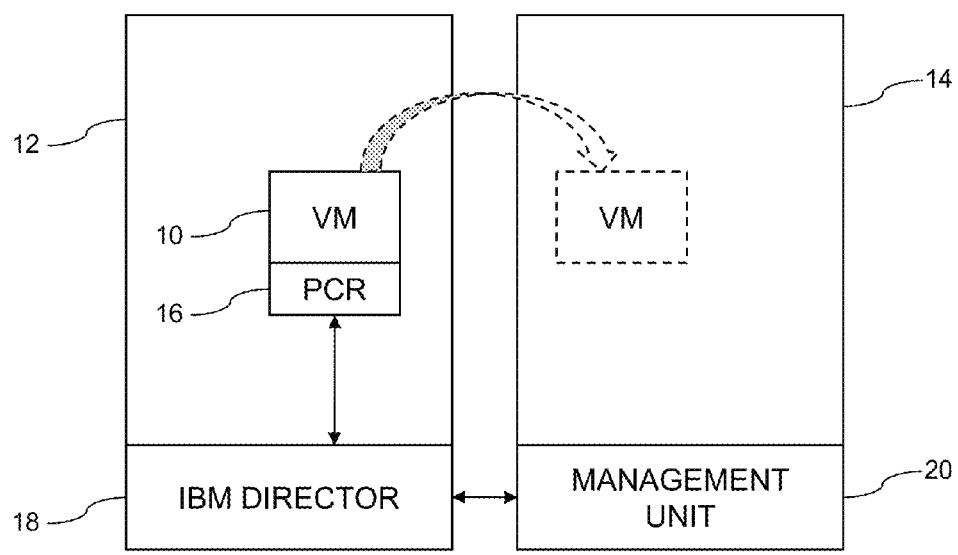
FIG. 2 is a schematic diagram similar to FIG. 1, showing more detail.

The one or more servers providing the virtual machines 10 will implement a trusted boot and remote attestation by allowing an initial enrollment where the virtual machine 10 sets the trust values for the system. A virtual machine 10 is booted and all of its boot and bring-up trust measurements are established by a vTPM (virtual Trusted Platform Module) process and stored in platform configuration registers 16, known as PCRs, shown in FIG. 2. During the initial enrollment, the virtual machine 10 will report these PCR values to a director unit 18, which will in turn store these values as the virtual machine's base trust values. At any time moving forward, the director unit 18 may ask the virtual machine 10 for its current PCR values. The unit 18 will then compare some or all of these PCR values to the initial base trust values. If they do not match, then a security alert is asserted. The director unit 18 may obtain the original trust values in other ways besides during the enrollment process, which is one representative technique by which the director unit 18 can acquire the trust values.

This model is extended to solve the issue of migration of a virtual machine 10 when crossing security zones. Prior to moving the virtual machine 10 into its target security zone 14, the director unit 18 will transfer the VMs Base Trust Values. These values will be transferred to a trusted management unit 20 in the new zone 14. This could be the IBM Director controlling the target security zone 14, a third party trusted boot authority for the target security zone 14, or a component within the same director managing the target security zone 14. In the embodiment shown in FIG. 2, the management unit 20 is a separate component specific to the target zone 14.

Figure 3:
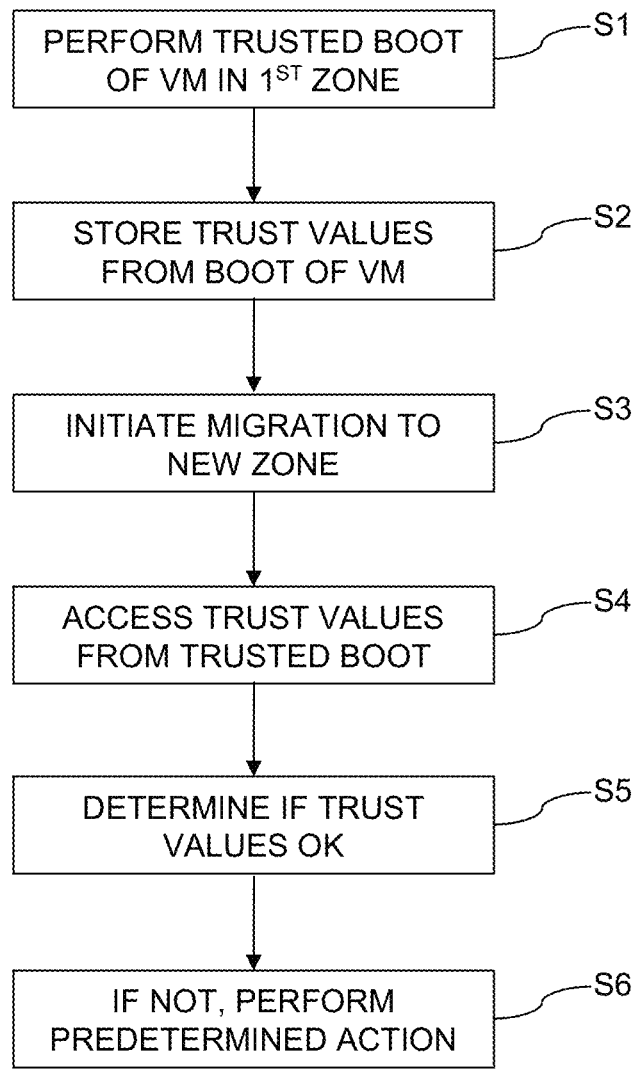
FIG. 3 is a flowchart of a method of migrating a virtual machine.

The method of performing the migration is summarized in FIG. 3. This method provides a way of attesting a virtual machine that is migrating from a first environment to a second environment. The method first comprises step S1, which is the step of performing a trusted boot of the virtual machine in the first environment, and second, a step S2 of storing one or more trust values generated during the trusted boot of the virtual machine. As detailed above, when a virtual machine is first booted in the first zone, then a trusted boot is performed and the trust values generated during that boot process are recorded in a way that binds them to the specific virtual machine.

The next step in the process comprises step S3, which is the step of initiating the migration of the virtual machine to the second environment. It is not material why the virtual machine is being migrated, only that a component has decided to attempt to migrate the virtual machine to the new zone. The next step is step S4 of accessing one or more stored trust values generated during the trusted boot of the virtual machine, which is followed by the step S5 of determining if the accessed trust values define a security setting sufficient for the second environment. The trust values generated during the trusted boot provide information about the virtual machine being run, such as the nature of the operating system and any updates applied.

Finally at step S6, if the accessed trust values do not define a security setting sufficient for the second environment, then a predetermined action is performed in relation to the migration of the virtual machine to the second environment. In one embodiment, this predetermined action is the prevention of the migration from taking place, but other actions are also possible. Since the trust values provide information about the virtual machine, then these trust values can be said to define a security setting in the context of a security requirement of the new zone. For example, the new zone may specify that any virtual machine operating in the zone has a specific update applied to it. This can be determined from the trust values generated during the original trusted boot.

The migration of the virtual machine 10 from a first zone 12 to a second zone 14 can be organized around a comparison of the security policies of the two different zones 12 and 14. Prior to virtual machine migration from a source security zone 12 or vLAN to different target security zone 14 or vLAN, the source attestation authority will report the PCR values, event logs, and dated history of attestations, including previous PCR values and event logs, to the target attestation authority. Also prior to the virtual machine migration, the source attestation authority will also report its security attestation policy to the target attestation authority in the new zone 14.

The target attestation authority will compare its own security attestation policy with the received policy. It will determine if the source policy is equivalent or better than the target policy. The target attestation authority will also examine the attestation log history. If the log history meets the target's policy on minimal attestation failures, remediations, attestation frequency and concerns about other security zones or VLANs, then no immediate attestation is needed and a typical migration is allow. Finally, if the above criteria is not met, then the migration is permitted to occur, but the target virtualization mechanism confines the virtual machine to a separate vLAN until a new attestation and security check can be performed and verify that the migrating VM meets the security requirements of the target.

Figure 4:
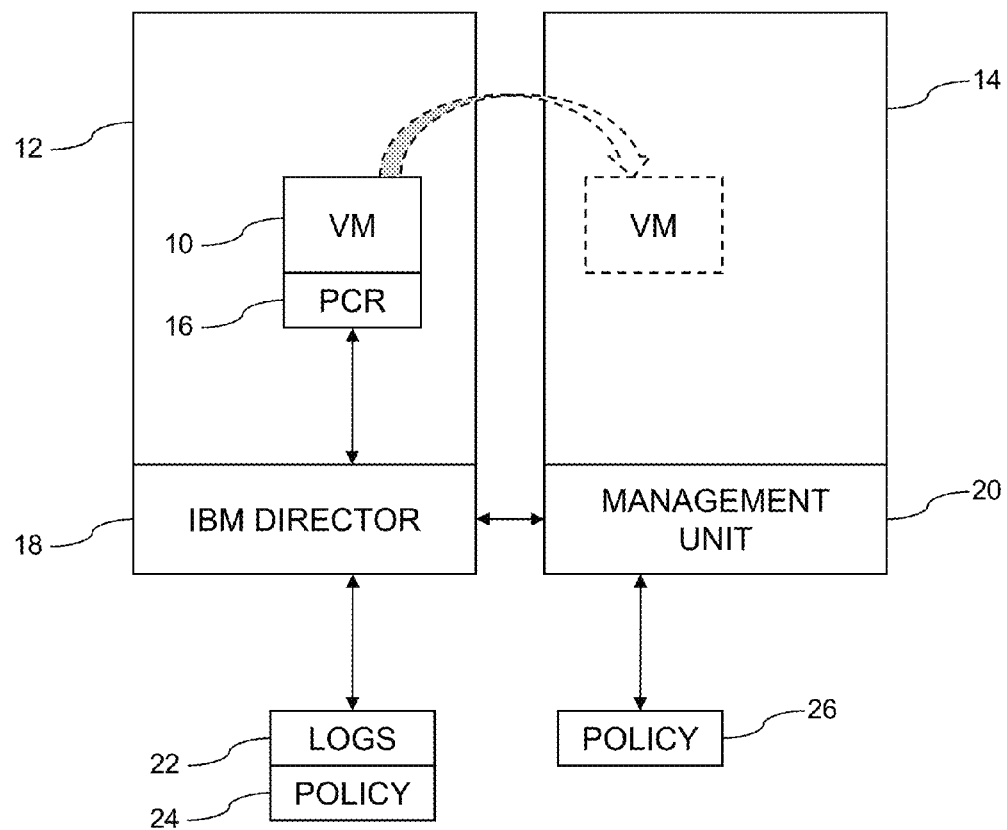
FIG. 4 is a further schematic diagram similar to FIG. 1.

Post-migration re-attestation of a migrating VM is illustrated in FIG. 4. The director unit 18 that relates to the first environment has a log history 22 for the specific virtual machine 10 and also its own policy 24 in relation to the security settings that are relevant for virtual machines that are booted in the first zone. The management unit 20 for the second zone 14 also has its own policy 26. The director unit 18 passes the log history 22 and the security policy 24 to the management unit 20. This information enables the unit 20, which is responsible for allowing the migration of the virtual machine 10 to proceed or to be restricted in some way, to determine whether the trust values of the virtual machine 10 are sufficient for the new zone 14.

The invention claimed is:

1. A method of attesting a virtual machine migrating from a first environment to a second environment comprising:
   in response to initiation of a migration of the virtual machine from the first environment to the second environment, a trusted management unit of the second environment:
      accessing one or more stored trust values of the virtual machine, wherein the one or more stored trust values are generated during a trusted boot of the virtual machine in the first environment, and wherein the one or more trust values comprise a first plurality of security settings that define a first security level that the virtual machine operates in at the first environment;
      determining a second security level associated with the second environment, wherein the second security level is defined by a second plurality of security settings for the second environment, and wherein the second security level defines a security requirement for virtual machines operating in the second environment;
      comparing the first security level to the second security level; and
      in response to comparing the first security level to the second security level, determining whether the first security level is at least equivalent to or higher than the second security level; and
   in response to determining that the first security level is not equivalent to or higher than the second security level, the trusted management unit of the second environment:
      completing the migration of the virtual machine to the second environment; and
      restricting of the virtual machine in the second environment by placing one or more limits on the operation of the virtual machine in the second environment, wherein the restricting further comprises confining the virtual machine to a particular separate virtual local area network (vLAN) until a subsequent security check is performed that verifies that the security setting of the virtual machine is equivalent to or better than the security setting defined by the second security policy for the second environment.

2. The method of claim 1, wherein restricting operation of the virtual machine in the second environment further comprises halting the migration of the virtual machine to the second environment.

3. The method of claim 1, wherein a director unit of the first environment transfers the one or more trust values to the trusted management unit prior to initiation of the migration of the virtual machine.

4. The method of claim 1, wherein the one or more stored trust values are bound to the virtual machine and are always transferred whenever the virtual machine is migrated to a new environment.

5. The method of claim 1, wherein the second security level is more stringent than the first security level.

6. The method of claim 1, wherein the one or more stored trust values are recorded in a platform configuration register (PCR) during a boot process of the trusted boot.

7. The method of claim 1, wherein the one or more trust values further comprise information on any updates applied to the virtual machine and a nature of the operating system of the virtual machine.

8. The method of claim 7, wherein the second plurality of security settings further define at least one specific update that is required to be applied to any virtual machine operating in the second environment.

9. The method of claim 1, further comprising in response to determining that the second security level is at least equivalent to or higher than the second security level, the trusted management unit of the second environment allowing the migration of the virtual machine to the second environment.

10. The method of claim 1, wherein the one or more limits further comprises limits on operations that the virtual machine can execute in the second environment.

11. The method of claim 1, wherein the one or more limits further comprises limits on communication channels that the virtual machine can utilize in the second environment.

* * * * *